(12) United States Patent
Kaskel

(10) Patent No.: US 8,647,419 B2
(45) Date of Patent: Feb. 11, 2014

(54) SORPTION FILTER MATERIAL AND USE THEREOF

(76) Inventor: Stefan Kaskel, Dresden (DE)

( * ) Notice: Subject to any disclaimer, the term of this patent is extended or adjusted under 35 U.S.C. 154(b) by 780 days.

(21) Appl. No.: 12/741,337

(22) PCT Filed: Aug. 7, 2008

(86) PCT No.: PCT/EP2008/006535
§ 371 (c)(1),
(2), (4) Date: Sep. 14, 2010

(87) PCT Pub. No.: WO2009/056184
PCT Pub. Date: May 7, 2009

(65) Prior Publication Data
US 2011/0010826 A1 Jan. 20, 2011

(30) Foreign Application Priority Data

Nov. 4, 2007 (DE) .......................... 10 2007 052 910
Jan. 18, 2008 (DE) .......................... 10 2008 005 218

(51) Int. Cl.
*B01D 53/02* (2006.01)
(52) U.S. Cl.
USPC .................................. 96/134; 2/457; 502/401

(58) Field of Classification Search
USPC .................................. 96/134; 2/457; 502/401
See application file for complete search history.

(56) References Cited

U.S. PATENT DOCUMENTS 6,083,298 A * 7/2000 Wang et al. ........................ 95/99
2009/0032023 A1 * 2/2009 Pastre et al. .............. 128/205.28

FOREIGN PATENT DOCUMENTS

WO  WO 2007101797 A1 * 9/2007 ............. B01D 53/02

* cited by examiner

*Primary Examiner* — Christopher P Jones
(74) *Attorney, Agent, or Firm* — Brannon Sowers & Cracraft PC

(57) ABSTRACT

The invention relates to a sorption filter material, in particular an adsorption filter material, which is suitable in particular for producing protective materials of all types (such as protective suits, protective gloves, protective shoes and other protective clothing as well as protective coverings, e.g. for transporting patients, for sleeping bags or similar) and for producing filters and filter materials. Said material is suitable for both military and civilian use, in particular for ABC applications.

14 Claims, 5 Drawing Sheets

SORPTION FILTER MATERIAL AND USE THEREOF

CROSS-REFERENCES TO RELATED APPLICATIONS

This application is a National Stage filing of International Application PCT/EP2008/006535, filed Aug. 7, 2008, claiming priority to German Applications DE 10 2007 052 910.6 filed Nov. 4, 2007, and DE 10 2008 005 218.3 filed on Jan. 18, 2008, entitled "Sorption Filter Material and Use Thereof." The subject application claims priority to PCT/EP2008/006535, and to German Applications DE 10 2007 052 910.6 and DE 10 2008 005 218.3 and incorporates all by reference herein, in their entirety.

BACKGROUND OF THE INVENTION

The present invention relates to a sorption filter material, in particular an adsorption filter material, according to the preamble of claim 1, which is suitable, in particular, for producing protective materials of all types (for example protective suits, protective gloves, protective shoes and other items of protective clothing and also protective coverings, e.g. for ambulances, sleeping bags and the like) and also for producing filters and filter materials and is thus suitable for both the military sector and the civilian sector, in particular for NBC use.

The present invention further relates to the use of this sorption filter material, in particular adsorption filter material, in the abovementioned protective materials and in the above-described filters and filter materials and also the abovementioned protective materials and the abovementioned filters and filter materials themselves.

There are a number of substances which are absorbed by the skin and lead to severe bodily injury. The blister-producing mustard gas (Yellow Cross) and the nerve poison Sarin may be mentioned as examples. Human beings which may come into contact. with such poisons have to wear suitable protective clothing or be protected against these poisons by suitable protective materials.

Protective suits which are impermeable to air and water vapor, for example, which are equipped with a rubber layer which is impermeable to chemical poisons are known for this purpose. A disadvantage is that these suits very quickly lead to heat buildup since they are impermeable to air and water vapor.

However, protective suits against chemical weapons which are intended for prolonged. use under a variety of conditions must not lead to heat buildup for the wearer. For this purpose, protective suits which are permeable to air and water vapor and offer a high degree of comfort for the wearer are known.

The permeable protective suits which allow passage of air have an adsorption filter layer comprising activated carbon which very lastingly binds the chemical poisons so that even strongly contaminated suits pose no risk to the wearer. The great advantage of such systems is that the activated carbon is also accessible from the inside, so that poisons which have got in through damaged regions or other permeable places can be adsorbed very quickly.

The adsorption layer in the above-described permeable protective suits which allow passage of air can be configured so that, for example, either activated carbon particles, in particular activated carbon grains or spheres, having an average size of up to about 2.0 mm are bound to small spots of adhesive printed onto a textile support material or else a reticulated polyurethane foam impregnated with a carbon paste composed of binder and activated carbon is employed as adsorption layer, with the adsorption layer generally being supplemented by an outer material (i.e. a covering material) and is covered by a light textile material on the inside facing the wearer.

Furthermore, there are also composites which comprise a sheet-like activated carbon fiber structure, e.g. an activated carbon fiber nonwoven or woven activated carbon fabric (cf., for example, WO 94/01198 A1 or the preceding EP 0 649 332 B1 or EP 0 230 097 A2).

Owing to its quite unspecific adsorptive properties, activated carbon is the most widely used adsorbent. Activated carbon is generally Obtained by carbonization (also known synonymously as low-temperature carbonization, pyrolysis, burning, etc.) and subsequent activation of carbon-containing starting compounds, with preference being given to starting compounds which lead to economically sensible yields (cf., for example, H. v. Kienle and E. Bäder, "Aktivkohle und ihre industrielle Anwendung", Enke Verlag Stuttgart, 1980).

However, the production of activated carbon is relatively energy-consuming. Furthermore, impregnation with metal salts has hitherto been necessary in order to achieve a desired adsorption efficiency, which represents an additional process step. Furthermore, the adsorption filter materials produced in this way do not always have the desired regenerability. In addition, the porosity and pore size distribution cannot readily be adjusted or tailored.

BRIEF SUMMARY OF THE INVENTION it is thus an object of the present invention to provide a sorption filter material, in particular an adsorption filter material or adsorption protective material, which at least largely avoids or reduces the above-described disadvantages of the prior art. In particular, such a sorption filter material should be suitable for producing NBC protective materials (e.g. protective suits, protective gloves, protective shoes and other items of protective clothing and also protective coverings, sleeping bags and the like) or filters and filter materials. In particular, the adsorption properties should be able to be tailored to the use.

A further object of the present invention is to produce a sorption filter material, in particular an adsorption filter material, which not only ensures good permeability to gas and/or water vapor but also a protective function against chemical and biological pollutants and poisons, in particular chemical and biological weapons.

Another object of the present invention is to provide a sorption filter material, in particular an adsorption filter material, which is, in particular, suitable for use in protective materials (e.g. protective suits, protective gloves, protective shoes and other items of protective clothing and also protective coverings, sleeping bags and the like) and when used in this way ensures a high degree of comfort for the wearer.

Finally, another object of the present invention is to provide a sorption filter material, in particular an adsorption filter material, which is, in particular, suitable for use in filters and filter materials (e.g. for the removal of pollutants, odorous substances and poisons of all types, in particular from streams of air and/or gas, e.g. NBC protective mask filters, odor filters, sheet-like filters, air filters, in particular filters for purification of air in a room, adsorptive support structures and filters for the medical sector) and when used in this way ensures good filter efficiency.

DETAILED DESCRIPTION OF THE INVENTION

Figure 1:
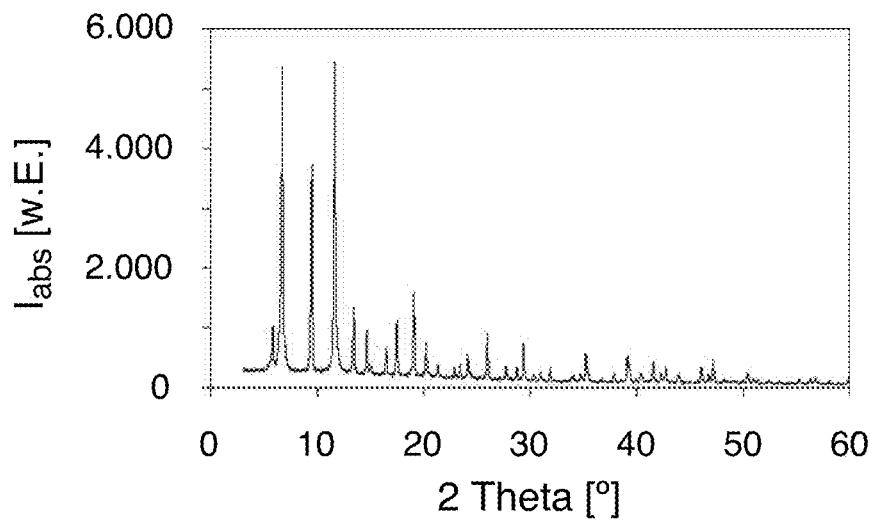
FIG. 1 provides the diffraction patterns of pure $Cu_3(BTC)_2$ (i.e. $Cu_3(BTC)_2$ in bulk).
Figure 2:
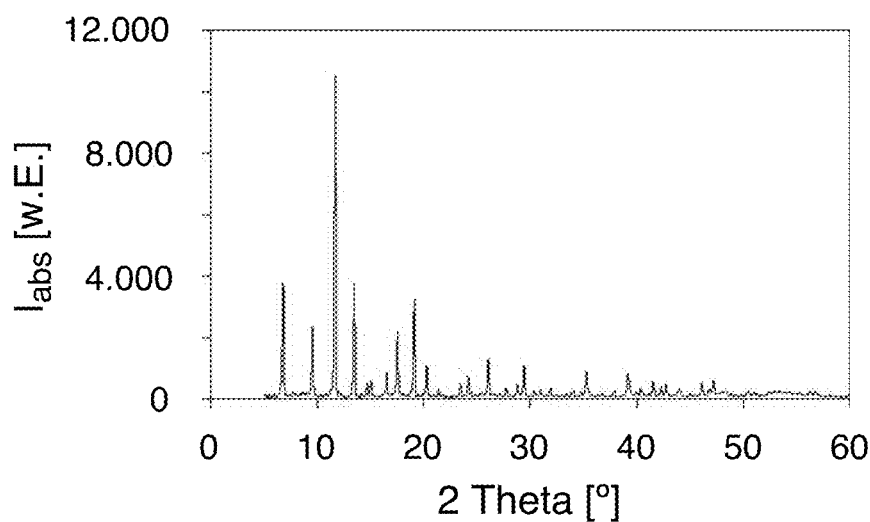
FIG. 2 provides the diffraction patterns of $Cu_3(BTC)_2$ in polymer spheres (PET).
Figure 3:
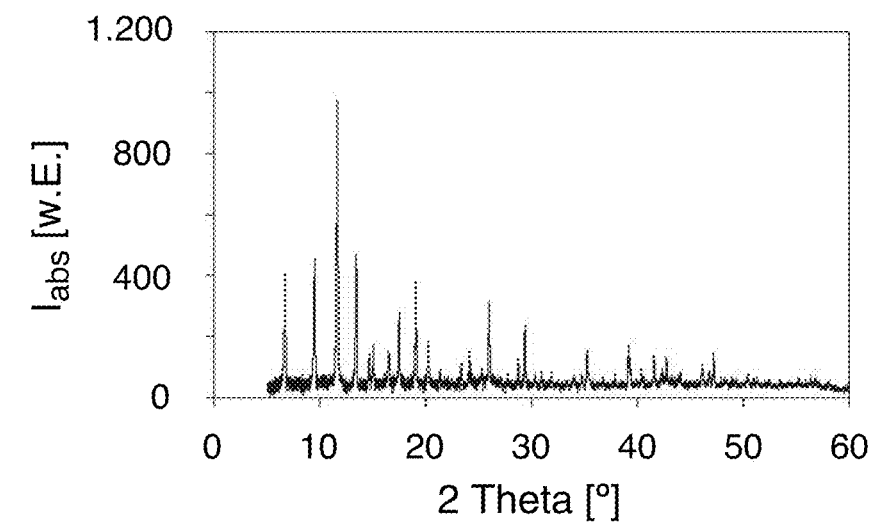
FIG. 3 provides the diffraction patterns of $Cu_3(BTC)_2$/PS spheres on nonwoven.
Figure 4:
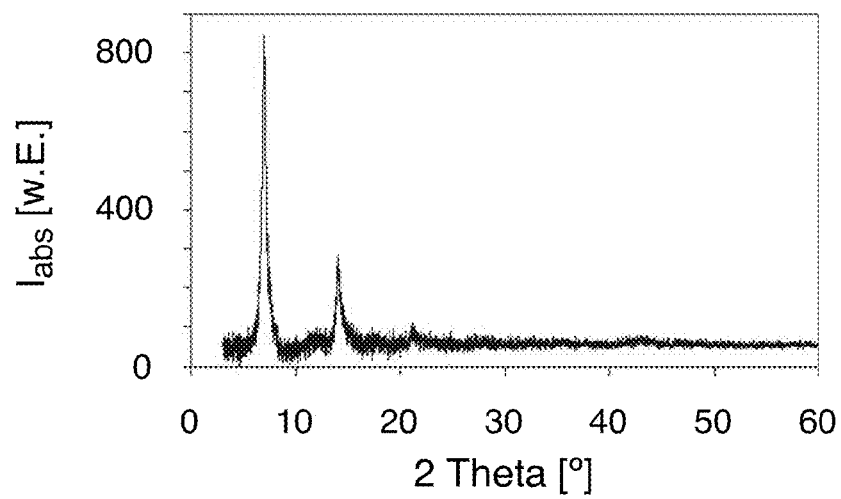
FIG. 4 provides the diffraction patterns of pure Al(NDC) (i.e. Al(NDC) in bulk).
Figure 5:
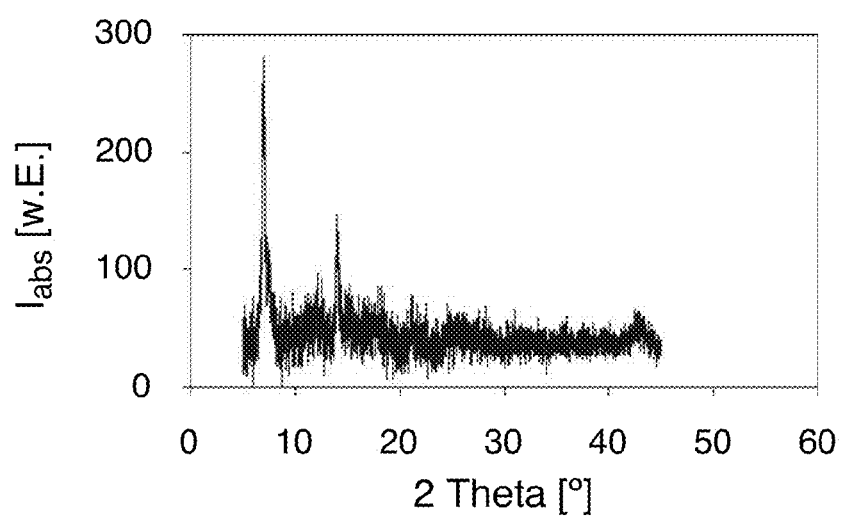
FIG. 5 provides the diffraction patterns of Al(NDC)/PS spheres on nonwoven.
Figure 6:
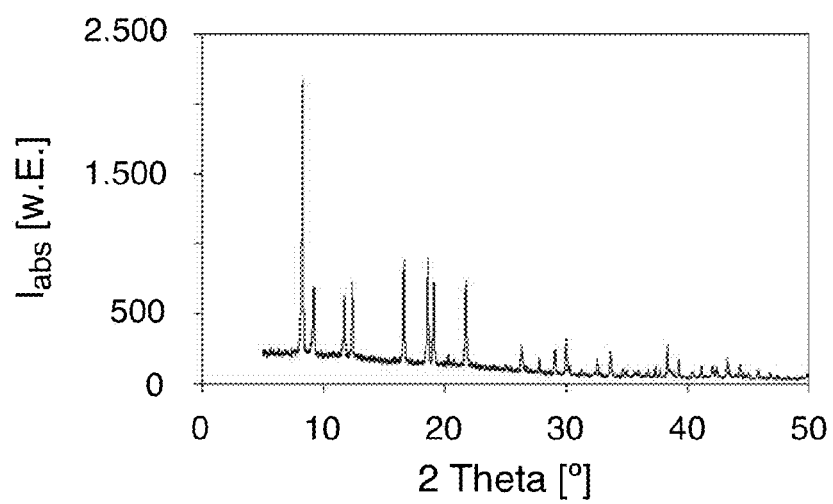
FIG. 6 provides the diffraction patterns of pure $Zn_2(BTC)_2$ (DABCO) (i.e. $Zn_2(BTC)_2$(DABCO) in bulk).
Figure 7:
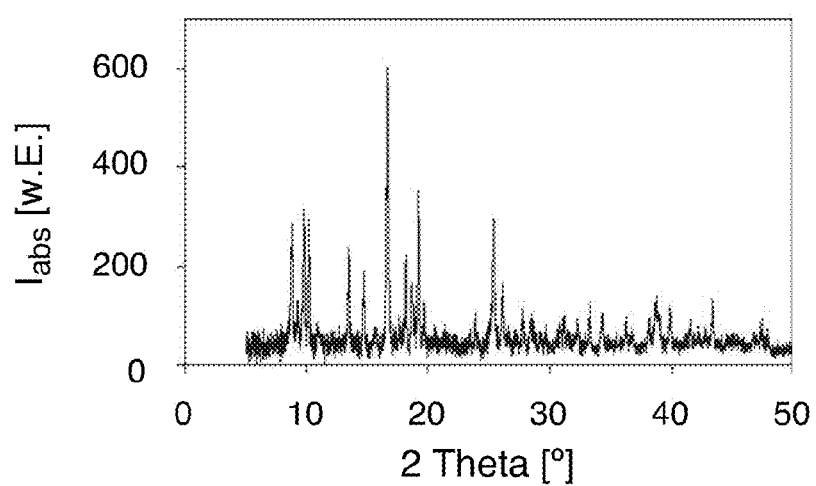
FIG. 7 provides the diffraction patterns of $Zn_2(BTC)_2$ (DABCO)/PET spheres on nonwoven.

To achieve the abovementioned objects, the present invention proposes, according to a first aspect of the present invention, a sorption filter material, in particular an adsorption filter material, according to claim 1. Further advantageous embodiments of the adsorption filter material of the invention are subject matter of the dependent claims.

The present invention further provides, according to a further aspect of the present invention, protective materials, in particular protective suits, protective gloves, protective shoes and other items of protective clothing and also protective coverings, sleeping bags and the like, which have been produced using the sorption titter material, in particular adsorption filter material, of the invention or comprise the sorption filter material, in particular adsorption filter material, of the invention.

The present invention also provides, according to another aspect of the present invention, filters and filter materials, in particular for the removal of pollutants, odorous substances and poisons of all types, in particular from streams of air and/or gas, e.g. NBC protective mask filters, odor filters, sheet-like filters, air filters, in particular filters for purification of air in a room, adsorptive support structures and filters for the medical sector, which have been produced using the sorption filter material, in particular adsorption filter material, of the invention or comprise the sorption filter material, in particular adsorption filter material, of the invention.

Furthermore, the present invention further provides, according to another aspect of the present invention, for the use of the sorption filter material, in particular adsorption filter material, of the invention for producing protective materials of all types, e.g. protective suits, protective gloves, protective shoes and other items of protective clothing and also protective coverings, sleeping bags and the like, preferably for NBC use, both for civilian applications and for military applications.

Finally, the present invention further provides, according to another aspect of the present invention, for the use of the sorption filter material, in particular adsorption filter material, of the invention for producing filters and filter materials of all types, in particular for the removal of pollutants, odorous substances and poisons of all types, in particular from streams of air and/or gas, especially for, for example, NBC protective mask filters, odor filters, sheet-like filters, air filters, in particular filters for purification of the air in a room, adsorptive support structures and filters for the medical sector.

The present invention accordingly provides, according to a first aspect of the present invention, a sorption filter material, in particular an adsorption filter material, which is, in particular, suitable for the sorption, preferably adsorption, of harmful chemical and/or biological materials such as chemical and/or biological weapons, where the sorption filter material has at least one support material which has been treated with a sorbent, in particular adsorbent, where the sorbent is based on at least one metal-organic framework (MOF), and in particular comprises at least one metal-organic framework (MOF) or consists thereof.

As regards the support material used according to the invention, this is generally gas-permeable, in particular air-permeable. It is preferred according to the invention for the support material used according to the invention to have a gas permeability, in particular air permeability, of at least 10 $l \cdot m^{-2} \cdot s^{-1}$, in particular at least 30 $l \cdot m^{-2} \cdot s^{-1}$, preferably at least 50 $l \cdot m^{-2} \cdot s^{-1}$, particularly preferably at least 100 $l \cdot m^{-2} \cdot s^{-1}$, very particularly preferably at least 500 $l \cdot m^{-2} \cdot s^{-1}$, and/or up to 10000 $l \cdot m^{-2} \cdot s^{-1}$, in particular up to 20000 $l \cdot m^{-2} \cdot s^{-1}$, at a flow resistance of 127 Pa.

In one embodiment, the support material used according to the invention can have a three-dimensional structure. In particular, the support material used according to the invention can, in this embodiment, be configured as a preferably open-pored foam, particularly preferably a polyurethane foam.

On the other hand, in an alternative embodiment, the support material used according to the invention can have a two-dimensional and/or sheet-like structure. In particular, the support material used according to the invention can, in this embodiment, be configured as a sheet-like, preferably textile, structure. For example, the support material can be configured as a sheet-like textile structure, preferably an air-permeable textile material, preferably a woven fabric, drawn-loop knit, formed-loop knit, lay-up or textile composite, in particular nonwoven. In particular, the support material can have a weight per unit area of from 5 to 1000 $g/m^2$, in particular from 10 to 500 $g/m^2$, preferably from 25 to 450 $g/m^2$, Thus, the support material in this embodiment can be a sheet-like textile structure containing natural fibers and/or synthetic fibers (chemical fibers) or consisting thereof; the natural fibers can be selected from the group consisting of wool fibers and cotton fibers (CO) and/or the synthetic fibers can be selected from the group consisting of polyesters (PES); polyolefins, in particular polyethylene (PE) and/or polypropylene (PP); polyvinyl chlorides (CLF); polyvinylidene chlorides (CLF); acetates (CA); triacetates (CTA); polyacrylonitrile (PAN); polyamides (PA), in particular aromatic, preferably flame-resistant polyamides (e.g. NOMEX®; polyvinyl alcohols (PVAL); polyurethanes; polyvinyl esters; (meth)acrylates; polylactic acids (PLA); activated carbon; and mixtures thereof.

To improve the filter efficiency and/or protective performance of the support material according to the invention, it can also be provided for the support material to have been oleophobicized and/or hydrophobicized (e.g. by means of appropriate impregnation, coating or the like).

If appropriate, the sorption filter material of the invention can be supplemented by further coatings or layers, e.g. by a topcoat which can be arranged, for example, on the side of the sorption material facing away from the support layer, so that a sandwich-like composite (support material/sorbent/topcoat) results. One or more further intermediate layers (e.g. barrier layers) can also be present. This is known per se to a person skilled in the art, so that no further details in this respect are necessary.

The sorbent is usually fixed on the support material. This can be realized, for example, by means of adhesive bonding (e.g. by means of an adhesive) or as a result of intrinsic stickiness or self-adhesion of the sorbent (e.g. by means of spray application or else by mixing with organic binders).

To achieve good sorption efficiency, the amounts of sorbent applied are in the range from 5 to 95% by weight, in particular from 7.5 to 90% by weight, preferably from 10 to 80% by weight, particularly preferably from 12.5 to 75% by weight, very particularly preferably from 15 to 70% by weight, based on the sorption filter material.

According to the invention, preference is given to the sorbent being present in particulate form, in particular in granular form, preferably in spherical form. The average particle diameter of the particulate sorbent can vary within a wide range; in particular, the average particle diameter of the particulate sorbent can be in the range from 0.01 μm to 10.0 mm, in particular from 0.1 μm to 5.0 mm, preferably from 0.5 μm to 2.5 mm, particularly preferably from 1 μm to 2.0 mm, very particularly preferably from 10 μm to 1.5 mm. The values given above for the average particle diameter can be determined, for example, in accordance with ASTM D2862-97/04, especially insofar as particle diameters ≥0.1 μm are concerned, or else by means of other conventional methods, e.g. dynamic light scattering, scanning or transmission electron microscopic methods, image analysis or the like, in particular insofar as particle diameters of ≤0.1 μm are concerned.

For the purposes of the present invention, sorbents, in particular adsorbents, used are "metal-organic frameworks" (MOFs), also referred to synonymously as "MOF substances", "MOF materials", "porous coordination polymers" or the like, which are generally porous and have a crystalline structure. These metal-organic frameworks have a relatively simple modular structure and form a new class of porous materials. The MOF is generally a mononuclear complex as crosslinking point ("node") to which a plurality of polyfunctional or polydentate ligands (ligands) are bound. The term "metal-organic framework (MOF)" was coined by Omar Yaghi, one of the pioneers in the field of metal-organic frameworks. Various compounds have been named by Yaghi simply on the basis of the order in time in which they were discovered (e.g. MOF-2 comes from the year 1998 and MOF-177 comes from the year 2004).

For the purposes of the present invention, the term metal-organic frameworks refers, in particular, to the inorganic-organic hybrid polymer obtained after its preparation, in particular after being freed of impurities, which is made up firstly of repeating structural units based on metal ions and, secondly, bridging, in particular at least bidentate ligands. The metal-organic frameworks are thus made up of metal ions which are joined to one another via at least bidentate organic ligands so as to form a three-dimensional structure which has internal voids (pores), with the pores being defined or determined by, in particular, the metal atoms and the organic ligands joining them. An MOF material can have exclusively the same metal ions (e.g. copper or zinc, etc.) or else two or more different metal ions (i.e. metal ions of a different type, e.g. copper and zinc, etc.).

Further details regarding metal-organic frameworks (MOFs) may be found, for example, in the review article by S. Kaskel, "Forum per Baukasten" in: Nachrichten aus der Chemie, 53, April 2005, pages 394 to 399, and also the references cited therein.

The preparation of metal-organic frameworks as such is likewise adequately known to those skilled in the art, so that no further details are necessary in this respect. in this context, reference may be made to the references cited above, in particular S. Kaskel (loc. cit.) and in addition the relevant patent literature, by way of example and not restricted to: WO 2007/023295 A2, US 2004/0097724 A1, WO 2005/049484 A1, WO 2005/068474 A1 and WO 2005/049892.

Metal-organic frameworks are thus porous, generally crystalline materials, in particular materials having a well-ordered crystalline structure comprising metal-organic complexes having transition metals (e.g. copper, zinc, nickel, cobalt, etc.) as nodes and organic molecules (ligands) as connection or linker between the nodes. Owing to their porosity, these materials have hitherto been proposed only as materials for gas storage, for example for the storage of hydrogen or methane. Their use as catalysts because of the high internal surface area (BET or Langmuir) with values up to over 4500 m$^2$/g has been considered, but there are as yet no specific applications of this type.

According to the present invention, the applicant has for the first time and surprisingly discovered that these metal-organic frameworks are also highly suitable for use as sorbents, in particular adsorbents, in adsorption filter materials and there surprisingly give performance which is at least equivalent if not superior to that of conventional activated carbon-based adsorbents, Another important factor in this context is the fact that, owing to the pore size and/or pore size distribution which can be set precisely in the preparation of the metal-organic frameworks, it is possible to achieve a high selectivity in terms of the sorption behavior, in particular adsorption behavior, with the pore size and/or pore size distribution being able to be controlled, for example, via the type and/or size of the organic ligands.

In particular, the pore sizes and/or pore size distributions of the metal-organic frameworks can be set within a wide range via the type and/or number of the at least bidentate organic ligands and/or the type and/or oxidation state of the metal ions. Accordingly, it is possible for the metal-organic framework to contain micropores, mesopores and/or macropores. The presence of micropores and/or mesopores can be determined, for example, by nitrogen adsorption measurements at 77 K in accordance with DIN 66131, DIN 66135 and/or DIN 66134.

For the purposes of the present invention, the term micropores refers to pores having pore diameters of up to 20 Å inclusive, while the term mesopores refers to pores having pore diameters in the range from >20 Å to 500 Å inclusive and the term macropores refers to pores having pore diameters of >500 Å, where these definitions of the pores correspond to the definitions given in *Pure Appl. Chem.* 45 (1976), pages 71 ff, in particular page 79:

micropores: pore diameter$_{microspores}$≤20 Å
mesopores: 20 Å<pore diameter$_{mesospores}$≤500 Å
macropores: pore diameter$_{macrospores}$>500 Å.

A particular advantage of the metal-organic frameworks used as sorbent, in particular adsorbent, is the fact that both the pore size and the pore size distribution of these porous materials can be set in a targeted manner during the synthesis, in particular, as indicated above, via the type and/or number of ligands and/or via the type and/or oxidation state of the metal used. Thus, for example, sorbents having a monomodal distribution of the pore size, for example sorbents which are predominantly microporous, sorbents which are predominantly mesoporous or sorbents which are predominantly macroporous, can be prepared in this way, it is likewise possible to obtain polymodal pore size distributions (e.g. sorbents having an in each case high proportion, e.g. equal proportion, of micropores and mesopores), as long as this is desirable for the respective application.

Accordingly, depending on the metal-organic frameworks used in each case, the properties of the sorbents, for example the internal surface areas (BET or Langmuir) and total pore volumes, can be varied within wide ranges, as described below.

For the purposes of the present invention, a sorbent based on at least one metal-organic framework (MOF) is thus used, as described above.

In an embodiment of the present invention, the sorbent can consist of the at least one metal-organic framework (MOF), i.e. the sorbent contains the at least one metal-organic framework (MOF) in bulk or as such (i.e. without a further hinder, etc.).

In an alternative embodiment of the present invention, on the other hand, the sorbent can comprise a mixture of metal-organic framework (MOF) and organic binder, i.e. in this embodiment, the sorbent comprises the at least one metal-organic framework (MOF) incorporated in an organic binder. Here, the MOF/binder ratio can vary within a wide range; in particular, the sorbent can, in this embodiment, contain metal-organic framework (MOF) and organic binder in an MOF/binder ratio of >1 and in particular in the range from 1:1 to 10:1, in particular from 1.1:1 to 5:1, preferably from 12:1 to 3:1, particularly preferably from 1.4:1 to 2.5:1. The organic binder is preferably an organic polymer; the organic binder can be selected, for example, from the group consisting of polyesters, polystyrenes, poly(meth)acrylates, polyacrylates, celluloses, polyamides, polyolefins, polyalkylene oxides and mixtures thereof.

In this embodiment, in which the sorbent comprises a mixture of metal-organic framework (MOF) and organic binder, a wide variety of variants are possible: for example, in one variant, the mixture of metal-organic framework (MOF) and organic binder can be present in a form which can be processed to give shaped bodies, in particular in the form of spheres, grains, pellets, granules, rods, pills, tablets or the like; shaping can have been carried out, for example, by shaping processes customary for these purposes, in particular compounding, extrusion, pressing, melt pressing or the like. In an alternative embodiment, the hinder can, in contrast, he present in sheet-like and/or two-dimensional form, in particular in the form of a membrane, a sheet, a film or the like (e.g. with thicknesses in the range from 0.1 μm to 10 mm, in particular from 0.5 μm to 1 mm, preferably from 1 μm to 0.1 mm), where the metal-organic framework (MOF), preferably in particulate form, is attached thereto and/or incorporated therein; in the case of closed binder layers, a gas-impermeable, in particular air-impermeable, but preferably water vapor-permeable breathing-active) harrier layer of binder with MOP attached thereto and/or embedded therein results.

As indicated above, the metal-organic framework (MOF) used as sorbent comprises structural repeating units based on at least one metal, in particular metal atom or metal ion, and at least one at least bidentate and/or bridging organic ligand.

As metal, it is in principle possible to use all metals of the Periodic Table of the Elements which are able to form a porous metal-organic framework with at least one at least bidentate and/or bridging organic compound (ligand).

In particular, preference is given, for the purposes of the present invention, to the metal-organic framework (MOF) comprising at least one at least metal, in particular metal atom or metal ion, selected from among elements of groups Ia, IIa, IIIa, IVa to VIIIa and also Ib and VIb of the Periodic Table of the Elements, preferably selected from the group consisting of Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Ti, Si, Ge, Sn, Pb, As, Sb and Bi, particularly preferably selected from the group consisting of Zn, Cu, Ni, Pd, Pt, Ru, Th, Fe, Mn, Ag, Al and Co, very particularly preferably selected from the group consisting of Cu, Fe, Co, Zn, Mn, Al and Ag, even more preferably selected from the group consisting of Cu, Fe, Al and Zn.

As regards the ligand or ligands, the metal-organic framework (MOF) has at least one at least bidentate and/or bridging organic ligand which comprises at least one functional group which is able to form at least two coordinate bonds to a metal, in particular metal atom or metal ion, and/or form a coordinate bond to each of two or more metals, in particular metal atoms or metal ions, identical or different; here, the functional group of the ligand can have at least one heteroatom, preferably from the group consisting of N, O, S, B, P, Si and Al, particularly preferably N, O and S. The ligand can preferably be selected, in particular, from among at least divalent organic acids, in particular dicarboxylic acids, tricarboxylic acids, tetracarboxylic acids and mixtures thereof, particularly preferably unsubstituted or at least monosubstituted aromatic dicarboxylic, tricarboxylic or tetracarboxylic acids having, in particular, one, two, three, four or more rings; here each of the rings can contain at least one heteroatom, identical or different, such as in particular N, O S, B, P, Si and or Al, preferably N, S and/or O.

The metal-organic framework (MOF) is usually present in crystalline form. In particular, the degree of crystallinity can be at least 60%, in particular at least 70%, preferably at least 80%, particularly preferably at least 90%, particularly preferably at least 95%, very particularly preferably at least 99% or more. As a result of the crystallinity, particularly good hardnesses, abrasion resistances and/or rupture strengths of the sorbent can be obtained according to the invention, which has a positive effect on the use properties of the sorption filter material of the invention.

Particularly advantageous properties of the sorption filter material of the invention, in particular in respect of the sorption properties, can be achieved when the sorbent or the metal-organic framework (MOF) is present in activated form. Such activation generally leads to a not inconsiderable increase in the internal surface area (BET and Langmuir) and the total pore volume of the sorbent or the metal-organic framework (MOF). Activation can advantageously be achieved by subjecting the sorbent or the metal-organic framework (MOF) to a heat treatment, in particular after it has been prepared or before it is used in the sorption filter material of the invention. The thermal treatment to effect activation is carried out below the decomposition temperature, in particular at temperatures in the range from 90° C. to 300° C., preferably from 100° C. to 250° C., more preferably from 110° C. to 220° C., preferably over a period of from 0.1 to 48 hours, in particular from 1 to 30 hours, preferably from 5 to 24 hours. The heat treatment can be carried out either under an at least substantially unreactive, preferably at least substantially inert, atmosphere or else in an oxidizing atmosphere (for example in the presence of oxygen, e.g. under the ambient atmosphere). Without wishing to be tied to a particular theory, the positive effect of the activating treatment can be explained by existing pores being freed or purified of any impurities and/or additional pores, cracks, crevices or the like being generated on the surface of the MOFs during the activation, so that the porosity of the MOFs and thus the total pore volume and the internal surface area increase.

In the case of all figures given above and below for parameters, it should be noted that the limit values indicated, in particular upper and lower limits, are included, i.e. all values quoted include the respective limits unless indicated otherwise in the particular case. Furthermore, it goes without saying that it may be necessary in a particular case or for the purposes of a particular application to deviate slightly from the limits mentioned without going outside the scope of the present invention.

The values given above and below for parameters are determined using standardized or explicitly described methods of determination or else by means of determination methods with which a person skilled in the art will be familiar.

The parameter values concerning the characterization of the porosity and the associated parameters such as, in particular, total porosity, internal surface area, pore size, pore size distribution, adsorption volume, adsorbed volume, etc., are in each case obtained from the nitrogen isotherms of the MOF or sorbent concerned or measured, in particular the nitrogen isotherms at low temperatures (usually at T=77 kelvin, unless indicated otherwise).

As described above, the metal-organic framework (MOF) used according to the invention as sorbent has internal voids, in particular pores, i.e. the metal-organic framework (MOF) is porous. This results in relatively high internal surface areas and total pore volumes.

Thus, the metal-organic frameworks (MOFs) used according to the invention as sorbents have, in particular, a very large total pore volume determined by the Gurvich method, so that a large adsorption capacity is made available. As regards the determination of the total pore volume by the Gurvich method, this is a measurement/determination method which is known per se to a person skilled in this field; for further details regarding the determination of the total pore volume by the Gurvich method, reference may be made, for example, to L. Gurvich (1915), J. Phys. Chem. Soc. Russ. 47, 805, and to S. Lowell et al., *Characterization of Porous Solids and Powders: Surface Area Pore Size and Density*, Kluwer Academic Publishers, Article Technology Series, pages 111 ff.

In general, the total pore volume determined by the Gurvich method of the metal-organic frameworks (MOFs) used according to the invention as sorbents is at least 0.1 cm$^3$/g, in particular at least 0.2 cm$^3$/g, preferably at least 0.3 cm$^3$/g, and can reach values of up to 2.0 cm$^3$/g, in particular up to 3.0 cm$^3$/g, preferably up to 4.0 cm$^3$/g, particularly preferably up to 5.0 cm$^3$/g.

In general, the total pore volume determined by the Gurvich method of the metal-organic frameworks (MOFs) used according to the invention as sorbents is in the range from 0.1 to 5.0 cm$^3$/g, in particular from 0.2 to 4.5 cm$^3$/g, preferably from 0.3 to 4.0 cm$^3$/g.

The weight-based and volume-based volumes (sorption volumes) $V_{ads}(N_2)$ of the metal-organic frameworks (MOFs) used according to the invention as sorbents are also sufficiently high at various partial pressures $p/p_0$:

Thus, the metal-organic frameworks (MOFs) used according to the invention as sorbents generally have a weight-based adsorbed N7 volume $V_{ads(wt.)}$ determined at a partial pressure $p/p_0$ of 0.25 (T=77 K) in the range from 10 to 1000 cm$^3$/g, preferably from 20 to 850 cm$^3$/g, particularly preferably from 30 to 800 cm$^3$/g.

Furthermore, the metal-organic frameworks (MOFs) used according to the invention as sorbents generally have a volume-based adsorbed $N_2$ volume $V_{ads(vol.)}$ determined at a partial pressure $p/p_0$ of 0.25 (T=77 K) in the range from 10 to 500 cm$^3$/cm$^3$, preferably from 20 to 400 cm$^3$/cm$^3$, particularly preferably from 30 to 300 cm$^3$/cm$^3$.

Furthermore, the metal-organic frameworks (MOFs) used according to the invention as sorbents generally have a weight-based adsorbed $N_2$ volume $V_{ads(wt.)}$ determined at a partial pressure $p/p_0$ of 0.995 (T=77 K) in the range from 40 to 3000 cm$^3$/g, preferably from 50 to 2750 cm$^3$/g, particularly preferably from 100 to 2500 cm$^3$/g.

Finally, the metal-organic frameworks (MOFs) used according to the invention as sorbents generally have a volume-based adsorbed $N_2$ volume $V_{ads(vol.)}$ determined at a partial pressure $p/p_0$ of 0,995 (T=77 K) in the range from 30 to 1000 cm$^3$/cm$^3$, preferably from 40 to 800 cm$^3$/m$^3$, particularly preferably from 50 to 700 cm$^3$/cm.

Owing to their porous structures, the metal-organic frameworks (MOFs) used according to the invention as sorbents generally have equally high internal or specific surface areas (BET and also Langmuir).

The Langmuir isotherm is the simplest sorption model having a physical basis cf., for example, I. Langmuir "*Surface Chemistry*", Nobel Lecture, 14 Dec. 1932, in: *Nobel Lectures, Chemistry* 1922-1941 Elsevier Publishing Company, Amsterdam, 1966, PDF version at nobel-prize.org, i.e. http://nobel-prize.org/nobel_prizes/chemistry/laureates/1932/langmuir-lecture.html). This is based on the assumptions that the adsorption takes place in a single molecular layer, all sorption sites are equivalent and the surface is uniform and there are no interactions between neighboring sorption sites and adsorbed particles; the Langmuir isotherm can consequently only indicate a maximum loading of the sorption surfaces.

The BET model, on the other hand, expands the Langmuir isotherm to the behavior at high concentration of the sorbate close to the solubility or saturation concentration, with the BET model being based on the sorption occurring in. a plurality of molecular layers on the surface, so that the loading can in theory increase without limit (cf., for example, S. Brunauer, P. H. Emmett, E. Teller, "*Adsorption of Gas on Multimolecular Layers*", J. Am. Chem. Soc. 60, 1938, pages 309-319).

The determination of the specific surface area by the BET and Langmuir methods is well-known in principle to a person skilled in the art, so that further details do not have to he provided in this respect. All BET surface area figures are based. on the determination in accordance with ASTM D6556-04. For the purposes of the present invention, the multipoint BET determination method (MP-BET), in particular in a partial pressure range $p/p_0$ of from 0.05 to 0.1, which is adequately known to those. skilled in the art, is employed for determining the BET surface area.

As regards further details in respect of the determination of the BET surface area or in respect of the BET method, reference may also be made to the abovementioned ASTM D6556-04 and to Römpp Chemielexikon, 10th edition, Georg Thieme Verlag, Stuttgart/New York, keyword: "BET method", including the references cited therein, and to Winnacker-Küchler (3rd edition), Volume 7, pages 93 if and to Z. Anal. Chem. 238, pages 187 to 193 (1968).

As stated above, a further characteristic of the metal-organic frameworks (MOFs) used according to the invention as sorbents is the relatively large Langmuir surface area which can usually be at least 150 m$^2$/g, in particular at least 250 m$^2$/g, preferably at least 300 m$^2$/g, particularly preferably at least 375 m$^2$/g, very particularly preferably at least 750 m$^2$/g, even more preferably at least 1500 m$^2$/g, and can generally take on values of up to 6000 m$^2$/g, in particular up to 6250 m$^2$/g, preferably up to 6500 m$^2$/g, particularly preferably up to 6750 m$^2$/g, very particularly preferably up to 7000 m$^2$/g, even more preferably up to 7500 m$^2$/g. Generally, the Langmuir surface area of the metal-organic frameworks (MOFs) used according to the invention as sorbents is in the range from 150 m$^2$/g to 7500 m$^2$/g, in particular from 225 m$^2$/g to 7000 m$^2$/g, preferably from 300 m$^2$/g to 6500 m$^2$/g, particularly preferably from 375 m²/g to 6250 m²/g, very particularly preferably from 750 m²/g to 6000 m²/g.

As has likewise been indicated above, a further characteristic of the metal-organic frameworks (MOFs) used according to the invention as sorbents is the relatively large BET surface area which can usually be at least 100 m²/g, in particular at least 150 m²/g, preferably at least 200 m²/g, particularly preferably at least 250 m²/g, very particularly preferably at least 500 m²/g, even more preferably at least 1000 m²/g, and can generally take on values of up to 4000 m²/g, in particular up to 4250 m²/g, preferably up 4500 m²/g, particularly preferably up to 4750 m²/g, very particularly preferably up to 5000 m²/g and more. In general, the BET surface area of the metal-organic frameworks (MOFs) used according to the invention as sorbents is in the range from 100 m²/g, to 5000 m²/g, in particular from 150 m²/g, to 4750 m²/g, preferably from 200 m²/g to 4500 m²/g, particularly preferably from 250 m²/g to 4250 m²/g, very particularly preferably from 500 m²/g to 4000 m²/g.

In addition, the metal-organic frameworks used according to the invention as sorbents have a good butane adsorption and at the same time a good iodine number, which characterizes their property of having good adsorption properties in respect of a wide variety of substances to be adsorbed.

Thus, the butane adsorption determined in accordance with ASTM D5742-95/00 of the metal-organic frameworks used according to the invention as sorbents is generally at least 10%, in particular at least 20%, preferably at least 30%. In general, the metal-organic frameworks used according to the invention as sorbents have a butane adsorption determined in accordance with ASTM D5742-95/00 in the range from 10 to 95%, in particular from 20 to 85%, preferably from 30 to 80%.

Depending on the pore size distribution, the metal-organic frameworks used according to the invention as sorbents can have equally good methylene blue and molasses adsorption numbers, which can together be considered to be a measure for that available surface area provided predominantly by mesopores and macropores. Thus, the methylene blue number or methylene blue adsorption refers to the amount of methylene blue adsorbed under defined conditions per defined amount of the sorbent (i.e. the number of ml of a standard methylene blue solution which are decolorized by a defined amount of dry and pulverized sorbent), related to relatively large micropores and predominantly relatively small mesopores and gives an indication of the adsorption capacity for molecules which have a size comparable to that of methylene blue. On the other hand, the molasses number is considered to be a measure of the mesoporosity and macroporosity and refers to the amount of sorbent necessary to decolorize a standard molasses solution, so that the molasses number gives an indication of the adsorption capacity for molecules which have a size comparable to that of molasses (in general sugarbeet molasses). Thus, the methylene blue and molasses numbers together can be considered to be a measure of the mesoporosity and macroporosity.

Thus, the methylene blue value determined by the method of the CEFIC (Conseil Européen des Fédérations de l'Industrie Chimique, Avenue Louise 250, Bte 71, B-1050 Brussels, November 1986, European Council of Chemical Manufacturers' Federations, Test Methods for Activated Carbons, paragraph 2.4 "Methylene Blue Value", pages 27-28) of the metal-organic frameworks used according to the invention as sorbents can be at least 5 ml, in particular at least 7.5 ml, preferably at least 10 ml, and generally be in the range from 5 to 100 ml, in particular from 7.5 to 80 ml, preferably from 10 to 75 ml.

The dimensionless molasses number, on the other hand, can basically be determined either by the Norit method (Norit N.Y., Amersfoort, Netherlands, Norit-Standard method NSTM 2.19 "*Molasses Number (Europe)*") or alternatively by the PACS method (PACS=Professional Analytical and Consulting Services Inc., Coraopolis, Pa., USA). In the determination of the molasses number by the Norit or PACS method, the amount of pulverized test material necessary to decolorize a standard molasses solution is determined, with the determination being carried out photometrically and the standard molasses solution being set relative to a standard. For the purposes of the present invention, the values of the molasses number are determined by the PACS method. Thus, the molasses number determined by the PACS method of the metal-organic frameworks used according to the invention as sorbents can be at least 30, in particular at least 35, preferably at least 40, and can generally be in the range from 30 to 1500, in particular from 35 to 1400, preferably from 40 to 1250, very particularly preferably from 50 to 1200.

Despite the high porosity, the metal-organic frameworks used according to the invention as sorbents have an acceptable pressure or rupture strength (ability to withstand weight loadings) and also an acceptable abrasion resistance.

Furthermore, the metal-organic frameworks used according to the invention as sorbents generally have a bulk density (apparent density) determined in accordance with ASTM D2854 in the range from 50 to 1000 g/l in particular from 100 to 900 g/l preferably from 150 to 800 g/l.

The use of a sorbent based on at least one metal-organic framework (MOF) in the sorption filter material, in particular adsorption filter material, of the invention enables a large number of advantages to be achieved. Mention may be made by way of example and not as a restriction of the excellent sorption behavior, in particular adsorption behavior, which is comparable to that of corresponding sorption filter materials based on activated carbon as sorbent, but at a lower energy consumption in production and with the additional advantage of the presence of metal ions in the metal-organic frameworks, which represent an additional catalytically active component and also lead to a certain biocidal or biostatic action in the use of the sorption filter material of the invention.

It has thus impressively been made possible within the scope of the present invention to provide a novel sorption filter material based on a sorbent which has been taken into consideration for the first time for this application and combines the technical properties of a sorbent, in particular adsorbent, and a catalytically active component in a single material.

Figure 8:
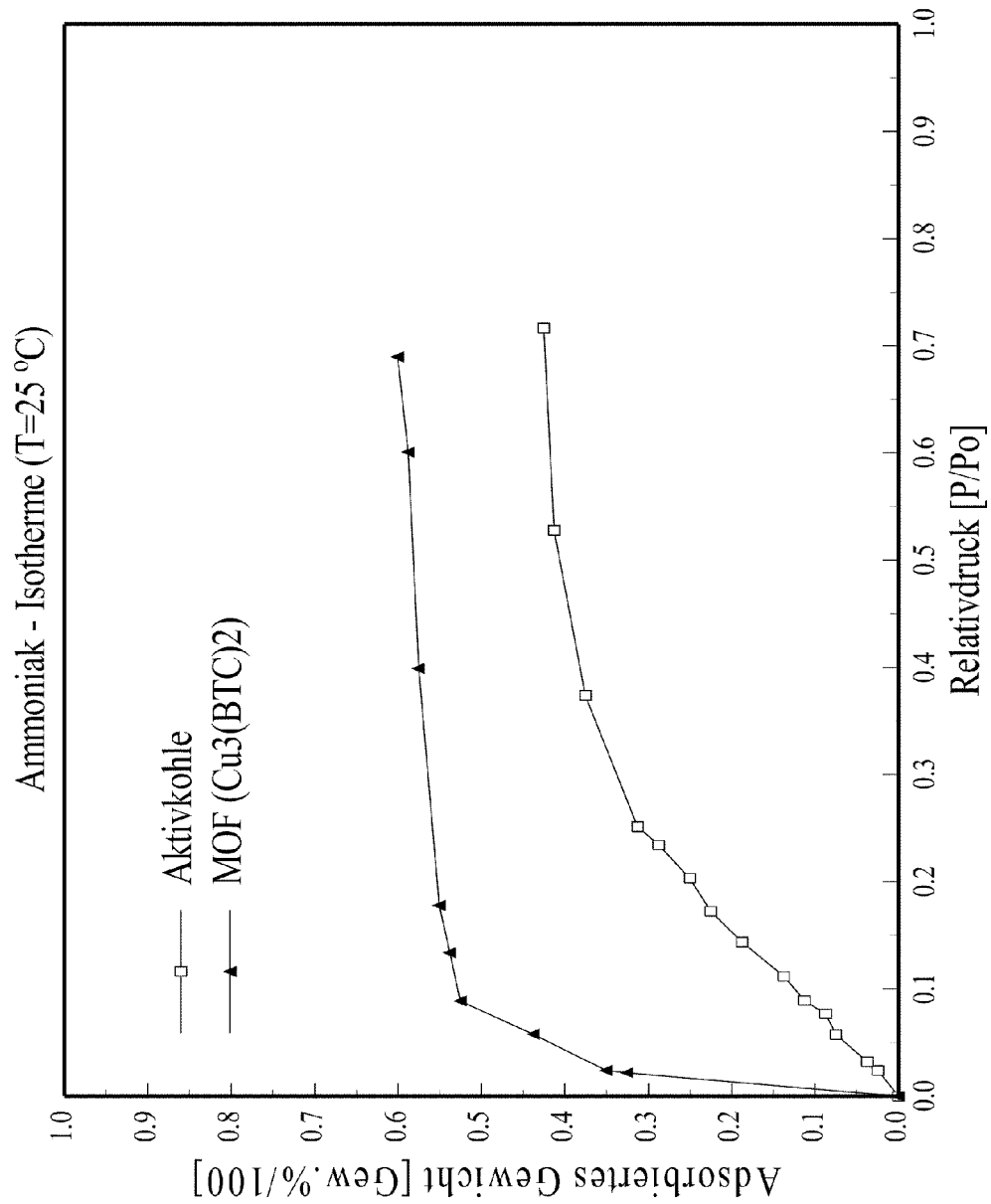
FIG. 8 provides the ammonia adsorption isotherms of MOF material (upper curve, there specifically: $Cu_3(BTC)_2$) and activated carbon (bottom curve).

As the applicant has surprisingly found, the MOFs used according to the invention as sorbents have an improved sorption behavior, in particular adsorption behavior, in respect of polar substances (e.g. ammonia, etc.) compared to conventional adsorbents (e.g. adsorbents based on activated carbon). Thus, the ammonia adsorption isotherms of MOF shown in FIG. 8 (see upper curve in FIG. 8, specifically $Cu_3(BTC)_2$, as MOF, also cf. examples below) and activated carbon (see bottom curve in FIG. 8) show that the MOF is able to adsorb the polar ammonia better or more efficiently than is activated carbon, which is shown by a larger amount of adsorbed ammonia in the case of the MOF compared to activated carbon, even though the adsorption capability in this respect of activated carbon can still be classified as satisfactory and efficient.

In a particular embodiment of the present invention, the metal-organic frameworks (MOFs) can be combined with a further, additional sorbent or adsorbent, in particular one based on activated carbon, in the sorption filter material of the invention, i.e. the metal-organic frameworks (MOFs) can be used together with a further sorbent or adsorbent, in particular one based on activated carbon. Thus, in one embodiment, the support material of the sorption filter material of the invention can, for example, be configured as a sheet-like activated carbon fiber structure; such sheet-like activated carbon structures can have, for example, a weight per unit area of from 20 to 200 g/m², in particular from 50 to 150 g/m², and these sheet-like activated carbon structures can be, for example, woven activated carbon fabrics, activated carbon knitteds, activated carbon lay-ups or activated carbon composites, for example ones based on carbonized and activated cellulose and/or a carbonized and activated acrylonitrile. An alternative possibility is to use particulate, preferably spherical activated carbon particles (known as granulated carbons, in particular spherical carbons, e.g. ones having an average diameter of the activated carbon particles of less than 1.0 mm, preferably less than 0.8 mm, more preferably less than 0.6 mm, but generally at least 0.1 min, for this purpose and then apply them, together with MOF-based sorbent particles, to the support material. In particular, the activated carbon particles can, in this embodiment, be applied in an amount of from 5 to 500 g/m², in particular from 10 to 400 g/m², preferably from 20 to 300 g/m², more preferably from 25 to 250 g/m², to the support material. In this particular embodiment, the activated carbon used preferably has, regardless of whether it is in the form of fibers, e.g. sheet-like activated carbon fiber structures) or particles, an internal surface area (BET) of at least 800 g/m², in particular at least 900 g/m², preferably at least 1000 g/m², more preferably in the range from 800 to 1500 m²/g. To increase the adsorption efficiency or the adsorption performance further, the additional sorbent or adsorbent can also be impregnated with at least one catalyst; catalysts which are suitable for the purposes of the invention are, for example, enzymes and/or metal ions, preferably copper, silver, cadmium, platinum, palladium, zinc and/or mercury ions, with the amount of catalyst being able to vary within a wide range and generally being from 0.05 to 12% by weight, preferably from 1 to 10% by weight, particularly preferably from 2 to 8% by weight, based on the weight of the additional sorbent or adsorbent.

Figure 9:
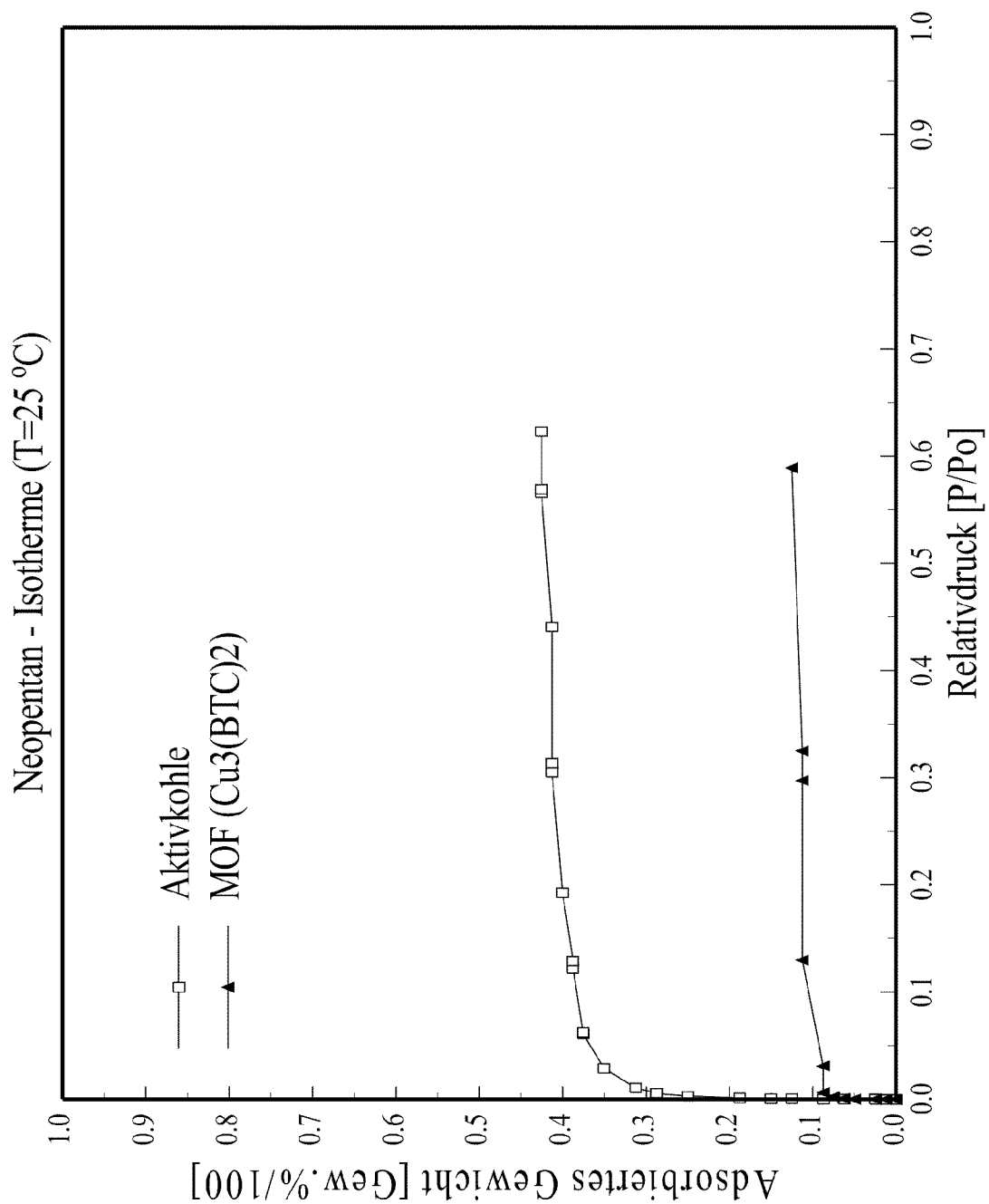
FIG. 9 provides the neopentane adsorption isotherms of activated carbon (upper curve and MOF material (bottom curve, there specifically: $Cu_3(BTC)$).

The applicant has not only, as indicated above, discovered that the MOF materials used according to the invention as sorbents have an improved sorption behavior, in particular adsorption behavior, in respect of polar substances compared to conventional adsorbents (e.g. adsorbents based on activated carbon) but also that activated carbon-based adsorbents have an improved sorption behavior, in particular adsorption behavior, in respect of nonpolar substances (e.g. hydrocarbons such as neopentane, etc.) compared to MOFs. Thus, the neopentane adsorption isotherms of activated carbon (see bottom curve in FIG. 9) and MOF material (see bottom curve in FIG. 9, there specifically $Cu_3(BTC)_2$ as MOF, cf. also examples below) in FIG. 9 show that the activated carbon is able to adsorb the nonpolar neopentane better or more efficiently than can the MOF material, which is shown by a larger amount of adsorbed neopentane in the case of activated carbon compared to the MOF, even though the adsorption capability in this respect of the MOF is still to be classified as satisfactory and efficient.

The above results and findings show that the combination provided by the invention according to a particular embodiment of MOP and at least one further, different adsorbent or sorbent, in particular one based on activated carbon, leads to particularly good results, since the different complimentary properties of the various sorbents are combined here in a single sorption filter material and a particularly good protective or sorptive effect is achieved in this way.

Further embodiments, modifications and variations of the present invention can readily be recognized and implemented by a person skilled in the art on reading the description, without going outside the scope of the present invention.

The present invention is illustrated below with the aid of the following examples, which do not, however, restrict the present invention in any way.

EXAMPLES

Synthesis and Characterization of a Metal-Organic Framework of the $Zn_2(BTC)_2(DABCO)$ Type:

4.06 g of $Zn(NO_3)_2 \cdot 4H_2O$ and 2.62 g of $H_3BTC$ (1,3,5-benzenetricarboxylic acid=trimesic acid) are dissolved in 150 ml of DMF (dimethylformamide) in a glass beaker and 0.885 g of DABCO (1,4-diazabicyclo[2.2.2]octane) are dissolved in 50 ml of DMF in a second glass beaker. The contents of the two glass beakers are combined and the suspension formed is stirred for about 15 minutes. The entire suspension is then divided over 5 autoclaves and subjected in a drying oven to the following temperature program:

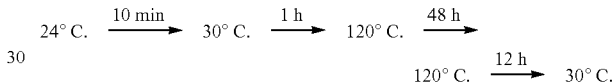

The product formed is filtered off, washed with DMF and dried at 100° C. under reduced pressure.

The product is characterized by means of the powder diffraction pattern. Determination of the BET surface area gives a value of 1370 m²/g, which can be increased to about 2055 m²/g by activation (24 hours at temperatures down to below 200° C. under an ambient atmosphere).

Synthesis and Characterization of a Metal-Organic Framework of the $Cu_3(BTC)_2$ Type:

The synthesis of $Cu_3(BTC)_2$ is carried out by the HDPE flask method. For this purpose, 10.4 g of $Cu(NO_3)_2 \cdot 3H_2O$ and 5.0 g of trimesic acid are stirred in 250 ml of a solvent mixture of DMF, ethanol and water (1:1:1) for 10 minutes and this mixture is subsequently introduced into a 1 liter HDPE flask. This is closed tightly and heated at 85° C. for 20 hours in a drying oven. The reaction vessel is subsequently taken from the oven and allowed to cool quickly to room temperature. The blue solid formed is filtered off and stirred in dichloromethane (DCM) for a period of 3 days in order to replace the solvent incorporated into the porous structure during the synthesis by a solvent which is easier to remove. To ensure better exchange, the solid is filtered off with suction every day and fresh DCM is used.

As an alternative, the synthesis can also be carried out in a solvent mixture of ethanol and water (1:1) in a heat- and pressure-resistant reaction vessel which is autoclaved at 120° C. for 12 hours.

The $Cu_3(BTC)_2$ product synthesized by this method is characterized by means of the powder diffraction pattern. Determination of the BET surface area gives a value of 1315 m²/g, which can be increased to about 2045 m²/g by activation (24 hours at temperatures down to below 200° C. under an ambient atmosphere).

Synthesis and Characterization of a Metal-Organic Framework of the Al(NDC) Type:

0.26 g (1.2 mmol) of 2,6-naphthalenedicarboxylic acid is dissolved in 30 ml of dimethylformamide (DMF). 0.52 g (1.4 mmol) of $Al(NO_3)_3 \cdot 9H_2O$ is added and the mixture is autoclaved at 110° C. in a 250 ml PTFE liner in a digestion vessel for 20 hours. After the product has been centrifuged off, the sediment is washed three times with DMF. The product is dried at 80° C. in air.

The Al(NDC) product synthesized by this method is characterized by means of the powder diffraction pattern. Determination of the BET surface area gives a value of 1400 m²/g, which can be increased to about 1954 m²/g by activation (16 hours at temperatures about 180° C. under an ambient atmosphere).

Introduction of $Cu_3(BTC)$, into a Polymer Matrix:

a) Production of Composite Spheres:

A particular amount of a prescribed polymer is dissolved by means of ultrasound in the solvent indicated below. The either activated (act.) or unactivated $Cu_3(BTC)_2$ which has previously been well ground in a mortar is dispersed therein. Since the activation of $Cu_3(BTC)_2$ is associated with a decrease in mass of about 30%, the amount used has to be adapted accordingly. This dispersion is added dropwise by means of a pipette to a solvent in which the polymer is insoluble. This results in the polymer precipitating in spherical form. The sphere size can be set via the rate of dropwise addition, with rapid dropwise addition promoting the formation of relatively small spheres and slow dropwise addition favoring the formation of relatively large spheres. The spheres are isolated and dried at 100° C. in a drying oven.

| Polymer | Amount of polymer used | Solvent (solv) | Amount of solv used | Amount of $Cu_3(BTC)_2$ used | Precipitate |
|---|---|---|---|---|---|
| PET | 0.25 g | HFIP* | 2 ml | 0.5 g (act.) | acetone |
| PET | 0.125 g | HFIP | 2 ml | 0.5 g (act.) | acetone |
| PET | 0.1 g | HFIP | 3 ml | 0.5 g (act.) | acetone |
| PET | 1 g | HFIP | 7.5 ml | 1.8 g | acetone |
| PET | 1 g | HFIP | 7.5 ml | 1.8 g | acetone |
| PET | 0.5 g | HFIP | 3.75 ml | 1.5 g | acetone |
| PET | 0.5 g | HFIP | 3.75 ml | 1.5 g | acetone |
| PET | 0.5 g | HFIP | 3.75 ml | 1.5 g | acetone |
| PET | 0.5 g | HFIP | 3.75 ml | 1.4 g | acetone |

*HFIP = 1, 1, 1, 3, 3, 3-hexafluoroisopropanol b) Results:

The surface areas of the products of the respective experiments are listed in the following table. Activation is in each case carried out for 24 hours at the temperature indicated:

| Activation temperature | BET surface area (absolute) | Langmuir surface area (absolute) | BET surface area (with subtraction of polymer) | Langmuir surface area (with subtraction of polymer) |
|---|---|---|---|---|
| 180° C. | 1222 m²/g | 1352 m²/g | 1296 m²/g | 1469 m²/g |
| 150° C. | 1166 m²/g | 1266 m²underline/g | 1199 m²/g | 1271 m²/g |
| 150° C. | 1170 m²/g | 1230 m²/g | 1340 m²/g | 1460 m²/g |
| 120° C. | 1260 m²/g | 1411 m²/g | 1390 m²/g | 1617 m²/g |
| 150° C. | 1210 m²/g | 1331 m²/g | 1315 m²/g | 1477 m²/g |
| 100° C. | 1343 m²/g | 1551 m²/g | 1515 m²/g | 1827 m²/g |

The composite spheres produced in this way are subsequently each fixed by means of a hot melt adhesive to a textile support material (nonwoven having a weight per unit area of about 75 g/m²) in a uniform distribution with an applied amount of 40% by weight, resulting in sorption filter materials according to the invention.

Production of MOF-Containing Membranes/Films:

a) Production of the Composite Membranes/Films:

A particular amount of a prescribed polymer is dissolved by means of ultrasound in the solvent indicated below. The activated (act.) or unactivated $Cu_3(BTC)_2$ which has previously been well ground is dispersed therein. Since a decrease in mass of about 30% occurs in the activation of $Cu_3(BTC)_2$, the amount used has to be adapted accordingly. This dispersion is introduced into a spray bottle and sprayed by means of compressed air onto a metal mesh which is resting on a dish containing the precipitant (here: acetone). This solvent should have a sufficiently high vapor pressure at room temperature. The membrane or film formed is subsequently dried at 100° C. in a drying oven.

| Polymer | Amount of polymer used | Solvent | Amount of solv used | Amount of $Cu_3(BTC)_2$ used | Precipitant |
|---|---|---|---|---|---|
| PET | 0.5 g | DCM:TFAA 1:1 | 4 ml | 1.4 g | acetone |
| PET | 0.5 g | HFIP | 3.75 ml | 1.5 g | acetone |
| PS | 0.5 g | toluene | 5 ml | 1.5 g | pentane | b) Results:

The surface areas of the products of the respective activation experiments are listed in the following table. Activation is in each case carried out for 24 hours at the temperature indicated:

| Activation temperature | BET surface area (absolute) | Langmuir surface area (absolute) | BET surface area (with subtraction of polymer) | Langmuir surface area (with subtraction of polymer) |
|---|---|---|---|---|
| 160° C. | 1007 m²/g | 1043 m²/g | 1011 m²/g | 1065 m²/g |
| 100° C. | 1417 m²/g | 1656 m²/g | 1626 m²/g | 1984 m²/g |

The composite membranes or films produced in this way are subsequently laminated over their full area onto a textile support material (woven polyester fabric having a weight per unit area of about 75 g/m²), resulting in sorption filter materials according to the invention having a barrier layer composed of binder containing MOFs.

Composites of a Different Type:

a) Production:

A particular amount of the prescribed polymer is dissolved by means of ultrasound in the indicated solvent. The activated ($Cu_3(BTC)_2$ which has previously been well ground is dispersed therein. This dispersion is tipped in its entirety into the precipitant. During the subsequent drying step at 100° C. in a drying oven, the "spheres" swell to more than twice their size due to evaporation of the solvent.

| Polymer | Amount of polymer used | Solvent | Amount of solv used | Amount of $Cu_3(BTC)_2$ used | Precipitant |
|---|---|---|---|---|---|
| PMMA | 1.5 g | acetone | 10 ml | 0.5 g (act.) | pentane |
| PMMA | 0.5 g | acetone | 5 ml | 0.5 g (act.) | pentane |
| PMMA | 0.25 g | acetone | 3 ml | 0.5 g (act.) | pentane |
| PMMA | 0.2 g | acetone | 2 ml | 0.5 g (act.) | pentane | b) Results:

The surface areas of the products of the respective experiments are listed in the following table. Activation is in each case carried out for 24 hours at the temperature indicated:

| Activation temperature | BET surface area (absolute) | Langmuir surface area (absolute) | BET surface area (with subtraction of polymer) | Langmuir surface area (with subtraction of polymer) |
|---|---|---|---|---|
| 120° C. | 1018 m²/g | 1029 m²/g | 1120 m²/g | 1180 m²/g |
| 120° C. | 1070 m²/g | 1110 m²/g | 1140 m²/g | 1220 m²/g |

The composites produced in this way are subsequently each fixed onto a textile support material (polyester knitted having a weight per unit area of about 97 g/m²), resulting in sorption filter materials according to the invention.

Further Production of Composite Spheres:

8.5 g of $Cu_3(BTC)_2$/PET spheres having a PET/$Cu_3(BTC)_2$ mass ratio of 1:2 are produced by the above-described method. For this purpose, $Cu_3(BTC)_2$ which has been freshly synthesized by the above-described method is used, with the subsequent cooling process deliberately being omitted since smaller crystallites result in better dispersibility.

The experiments carried out and the surface areas thereof are in following tables:

| Polymer | Amount of polymer used | Solvent | Amount of solv used | Amount of $Cu_3(BTC)_2$ used | Precipitant |
|---|---|---|---|---|---|
| PET | 4 g | HFIP | 30 ml | 9.0 g | acetone |
| PET | 3 g | HFIP | 22.5 ml | 4.5 g | acetone |
| PS | 4 g | HFIP | 30 ml | 4.5 g | acetone |
| PS | 3 g | HFIP | 22.5 ml | 3.0 g | acetone |

| Activation temperature/time | BET surface area (absolute) | BET surface area (with subtraction of the polymer) |
|---|---|---|
| 150° C./48 h | 1740 m²/g | 2069 m²/g |
| 120° C./48 h | 1640 m²/g | 1924 m²/g |
| 150° C./48 h | 1322 m²/g | 1537 m²/g |
| 120° C./48 h | 1340 m²/g | 1567 m²/g |
| 120° C./48 h | 1213 m²/g | 1402 m²/g |
| 120° C./48 h | 1232 m²/g | 1464 m²/g |

The $H_2O$ stability of $Cu_3(BTC)_2$ in the PET and PS spheres is examined. For this purpose, the previously synthesized spheres are stirred in water at room temperature for about 3 hours in order to test the $H_2O$ stability. No difference could be seen in the powder diffraction pattern.

The previously produced composite spheres are subsequently in each case fixed by means of a hot melt adhesive to a textile support material (nonwoven having a weight per unit area of about 88 g/m²) in a uniform distribution at an amount applied of about 35% by weight, resulting in sorption filter materials according to the invention.

Direct Spraying of the PET/$Cu_3(BTC)_2$ Suspension onto Various Nonwovens

The PET is dissolved in hexafluoroisopropanol, admixed with $Cu_3(BTC)_2$ and mixed in an ultrasonic bath. This dispersion is subsequently applied by the spray method to various nonwovens.

Here, no attack on the nonwoven by the solvent used can be observed. Furthermore, the specific surface area of the Cu-MOF remains constant (based on the amount of $Cu_3(BTC)_2$ used).

The stability of the polymer/$Cu_3(BTC)_2$ layer increases with increasing layer thickness, while the flexibility decreases.

The abovementioned polymer/$Cu_3(BTC)_2$ ratios are in each case used for the mixture used. The compositions correspond to those of the preceding experiments. Sorption filter materials according to the invention result.

| Activation temperature | BET surface area (absolute) without nonwoven | BET surface area (with subtraction of the polymer) without nonwoven |
|---|---|---|
| 120° C./48 h | 1734 m²/g | 2060 m²/g |
| 120° C./48 h | 1338 m²/g | 1413 m²/g |

| Activation temperature | BET surface area (absolute) without nonwoven | BET surface area (with subtraction of the polymer) without nonwoven |
|---|---|---|
| 120° C./48 h | 1222 m²/g | 1296 m²/g |
| 120° C./48 h | 1259 m²/g | 1360 m²/g |

Adhesive Bonding by Means of a Hot Melt Adhesive

A commercial hot melt adhesive is melted at 150° C. in a drying oven and subsequently applied to a nonwoven. Unmilled unactivated $Cu_3(BTC)_2$ is then immediately sprinkled onto the still liquid adhesive and the whole is pressed together until the adhesive has hardened. This results in a sorption filter material according to the invention.

Application by Means of a Commercial Spray Gun:

The method used here is equivalent to the above-described spray method, but a commercial airbrush gun (from Conrad Electronic, model HP 330) having a nozzle diameter of 0.4 mm is used. The paint cup of the gun is filled and the mixture is sprayed uniformly onto the nonwovens using a pressure of from 3 to 3.5 bar. The advantage of this method is the good reproducibility of the resulting layers on the nonwovens, their greater flexibility compared to the layers and the more homogeneous covering of the materials.

The experiments are carried out at two different $Cu_3(BTC)_2$/PET ratios, with the abrasion resistance of the layers formed increasing with increasing PET content. Sorption filter materials according to the invention result.

| PET/$Cu_3(BTC)_2$ ratio | Amount of $Cu_3(BTC)_2$ | Amount of PET | Volume of HFIP |
|---|---|---|---|
| 1:2 | 0.65 g | 0.25 g | 7 ml |
| 1:1.4 | 0.5 g | 0.25 g | 7 ml |

Adsorption Measurements and Comparisons:

Four sorption filter materials are produced; in all cases, an air-permeable, sheet-like textile material in the form of an oleophobicized and hydrophobicized woven polyester fabric having a weight per unit area of about 70 g/m² served as support material. In all four cases, particulate sorbents (amount of sorbent applied: about 35% by weight based on the sorption filter material) in the form of particulate or spherical sorbent particles are fixed by means of an adhesive (amount of adhesive applied: about 8 g/m²) in a grid of dots and in an uniform distribution to the support material.

The first two sorption filter materials serve for comparison and are not according to the invention. Material 1 is treated with an unimpregnated microporous activated carbon, while material 2 is treated with a metal salt-impregnated activated carbon of the same type (Cu/Zn/Ag impregnation with about 4.9% by weight of impregnation, based on activated carbon).

The two sorption filter materials according to the invention (material 3 and material 4) are treated with metal-organic frameworks based on $Cu_3(BTC)_2$, with the metal-organic framework being used in bulk or as such in the case of material 3, while it has been processed in binders to form spherical structures in the case of material 4 (binder: polyester; PET/$Cu_3(BTC)_2$ ratio=1.4).

The adsorbents in all four sorption filter materials have comparable properties, especially in respect of the internal surface areas and the microporosities:

| Material | BET surface area | Proportion of micropores based on total pores |
|---|---|---|
| 1 (n.i.) | 1455 m²/g | >96% |
| 2 (n.i.) | 1398 m²/g | >96% |
| 3 (i.) | 1435 m²/g | >98% |
| 4 (i.) | 1435 m²/g | >98% | n.i. = not according to the invention
i. = according to the invention

The respective barrier actions against mustard gas and soman are determined for all four sorption filter materials in accordance with method 2.2 of the CRDEC-SP-84010 in the convective flow test; for this purpose, a stream of air containing mustard gas or soman is allowed to act at a flow velocity of about 0.45 cm/s and a constant flow resistance on the respective adsorption filter material and the amount breaking through per unit area is determined after 16 hours (80% relative atmospheric humidity, 32° C., 10·1 µl of HD/12.56 cm², or 12·1 µl of 6D/12.56 cm²):

| Material | Mustard gas | Soman |
|---|---|---|
| 1 (n.i.) | 2.98 µg cm² | 3.09 µg/cm² |
| 2 (n.i.) | 1.96 µg/cm² | 2.09 µg/cm² |
| 3 (i.) | 1.11 µg/cm² | 1.75 µg/cm² |
| 4 (i.) | 1.91 µg/cm² | 1.99 µg/cm² | n.i. = not according to the invention
i. = according to the invention

In studies on the four sorption filter materials in respect of the protective action against microorganisms, excellent results were likewise obtained in the case of the sorption filter materials according to the invention: in experiments to test the biostatic properties in accordance with ASTM E2149-01 using *Klebsiella pneumoniae* or *Staphylococcus aureus* (in each case 1.5 to $3.0 \times 10^5$ CFU/ml), the percentage reduction in these agents after 24 hours is in both cases above 95% for the sorption materials according to the invention (i.e. materials 3 and 4), while in the case of materials 1 and 2 which are not according to the invention these values are only 53% and 90%, respectively. This shows that the biological protective function of the sorption filter materials according to the invention has also been improved.

Comparable results are also obtained using MOF-containing materials of the $Zn_2(BTC)_2(DABCO)$ type; here, the MOF component in the two above-described materials according to the invention has in each case been replaced by $Zn(BTC)_2(DABCO)$ (BET: 1498 m²/g, proportion of micropores >98%), resulting in materials 5 and 6 according to the invention on which the breakthrough of mustard gas and soman is likewise determined:

| Material | Mustard gas | Soman |
|---|---|---|
| 5 (i.) | 1.96 µg/cm² | 2.01 µg/cm² |
| 6 (i.) | 1.89 µg/cm² | 1.90 µg/cm² | i. = according to the invention

Comparable results are likewise obtained using MOP-containing materials of the Al(NDC) type; the MOP component in the two above-described materials according to the invention has in each case been replaced by Al(NDC) (BET: 1376 m²/g, proportion of micropores >98%), resulting in materials 7 and 8 according to the invention on which the breakthrough of mustard gas and soman is likewise determined:

| Material | Mustard gas | Soman |
|---|---|---|
| 7 (i.) | 1.79 μg/cm$^2$ | 1.91 μg/cm$^2$ |
| 8 (i.) | 1.82 μg/cm$^2$ | 1.98 μg/cm$^2$ | i. = according to the invention

Furthermore, the two materials 3 and 4 according to the invention are modified by being additionally treated with the unimpregnated microporous activated carbon of the noninventive material 1, but in each case the amounts applied are halved so that materials 9 and 10 result. The breakthrough of mustard gas and soman is likewise determined on these; a still better adsorption efficiency at an equal total applied amount is obtained as a result of the combination of the MOP-based materials with the activated carbon, which indicates synergy:

| Material | Mustard gas | Soman |
|---|---|---|
| 9 (i.) | 0.88 μg/cm$^2$ | 1.25 μg/cm$^2$ |
| 10 (i.) | 1.66 μg/cm$^2$ | 1.39 μg/cm$^2$ | n.i. = not according to the invention
i. = according to the invention

The above results demonstrate that an at least comparable to improved protective action in respect of chemical and biological weapons compared to the case of a metal salt-impregnated activated carbon can be obtained by means of metal-organic frameworks. The metal-organic frameworks combine an adsorptive action and a catalytic or biocidal or biostatic action in a single material. These properties characterize the metal-organic frameworks as sorbents, in particular adsorbents, in sorption filter materials, in particular for the sorption of harmful chemical and/or biological substances such as chemical or biological weapons.

Influence of Activation on the Sorption Performance:

To determine the influence of activation on the sorption properties, two sorption filter materials according to the invention are produced; an air-permeable sheet-like textile material in the form of an oleophobicized and hydrophobicized woven polyester fabric having a weight per unit area of about 105 g/m$^2$ served as support material in both cases. In both cases, particulate sorbents (amount of sorbent applied: about 40% by weight, based on sorption filter material) in the form of particulate sorbent particles are fixed by means of an adhesive (amount of adhesive applied: about 10 g/m$^2$) in a grid of dots and a uniform distribution to the support material.

Both sorption filter materials (material 11 and material 12) are treated with metal-organic frameworks based on Cu$_3$(BTC)$_2$; in the case of material 11, the metal-organic framework is used in unactivated form, while in the case of material 12 it is used in activated form (activation at 180° C. under an ambient atmosphere for 24 hours):

| Material | BET surface area | Proportion of micropores based on total pores |
|---|---|---|
| 11 (i.) | 1397 m$^2$/g | >98% |
| 12 (i.) | 1998 m$^2$/g | >98% | i. = according to the invention

The respective barrier actions toward mustard gas and soman are determined for both sorption filter materials in accordance with method 2.2 of the CRDEC-SP-84010 in the convective flow test:

| Material | Mustard gas | Soman |
|---|---|---|
| 11 (i.) | 1.99 μg/cm$^2$ | 2.30 μg/cm$^2$ |
| 12 (i.) | 1.76 μg/cm$^2$ | 1.89 μg/cm$^2$ | i. = according to the invention

In experiments to test the biostatic properties in accordance with ASTM 112149-01 using *Klebsiella pneumoniae* and *Staphylococcus aureus* (in each case 1.5-3.0×10$^5$ CFU/ml), the percentage reduction in respect of these agents after 24 hours is above 95% and 99% in the case of material 11 and material 12, respectively. The activating treatment of the MOFs used thus enables a significant increase in efficiency in the sorption filter materials concerned to be achieved.

The invention claimed is:

1. An adsorption filter material for the adsorption of harmful chemical and/or biological materials and chemical and/or biological weapons,
    wherein the sorption filter material has at least one gas-permeable support material which has been provided with at least one adsorbent,
    wherein the adsorbent comprises at least one metal-organic framework (MOF),
    wherein the metal organic framework (MOF) is present in activated form by means of heat treatment at temperatures in the range of from 90° C. to 300° C. for 1 to 30 hours in an inert atmosphere or in an oxidizing atmosphere, and
    wherein the support material is additionally provided with a further adsorbent based on activated carbon in the form of spherical activated carbon particles having an average diameter of at least 0.1 mm and less than 1.0 mm.

2. The adsorption filter material as claimed in claim 1, wherein the support material has a gas-permeability in the range of from 50 l·m$^{-2}$·s$^{-1}$ to 20000 l·m$^{-2}$·s$^{-1}$ at a flow resistance of 127 Pa.

3. The adsorption filter material as claimed in claim 1, wherein the support material has a three-dimensional structure and is configured as an open-pored foam.

4. The adsorption filter material as claimed in claim 1, wherein the support material has a two-dimensional structure and is configured as a textile sheet-like structure.

5. The adsorption filter material as claimed in claim 1, wherein the adsorbent comprising the at least one metal-organic framework (MOF) is fixed to the support material by means of an adhesive or as a result of intrinsic stickiness or self-adhesion.

6. The adsorption filter material as claimed in claim 1, wherein the adsorbent comprising the at least one metal-organic framework (MOF) is present in particulate form and having an average particle diameter of the particulate within the range of from 0.01 μm to 10.0 mm.

7. The adsorption filter material as claimed in claim 1, wherein the adsorbent comprising the at least one metal-organic framework (MOF) consists of the at least one metal-organic framework (MOF) or comprises the at least one metal-organic framework (MOF) in bulk or as such.

8. The adsorption filter material as claimed in claim 1, wherein the adsorbent comprising the at least one metal-organic framework (MOF) comprises a mixture of metal-organic framework (MOF) and an organic binder or wherein the adsorbent comprises the at least one metal-organic framework (MOF) in a form incorporated in an organic binder.

9. The adsorption filter material as claimed in claim 1, wherein the metal-organic framework (MOF) is present in crystalline form, with the degree of crystallinity being at least 60%.

10. The adsorption filter material as claimed in claim 1, wherein the metal-organic framework (MOF) is porous and has internal pores, wherein the metal-organic framework (MOF) has a total pore volume determined by the Gurvich method in the range of from 0.1 $cm^3/g$ to 5.0 $cm^3/g$.

11. The adsorption filter material as claimed in claim 1, wherein the adsorbent comprises the at least one metal-organic framework (MOF) is present in an applied amount in the range from 5 to 95% by weight, based on the adsorption filter material.

12. The adsorption filter material as claimed in claim 1, wherein the adsorbent based on activated carbon is configured as a sheet-like activated carbon structure or as grain-like activated carbon particles.

13. A protective material for the civilian or military sector, the protective material comprising a protective clothing, wherein the protective material comprises an adsorption filter material as claimed in claim 1.

14. A filtering material for the removal of pollutants, odorous substances and poisons of all types from streams of air or gas, the filtering material comprising an adsorption filter material as claimed in claim 1.

* * * * *